United States Patent [19]

Zimmermann

[11] Patent Number: 5,023,501
[45] Date of Patent: Jun. 11, 1991

[54] HORIZONTAL AXIS ELECTRICAL MACHINE WITH RADIAL SUPPORT BOLTS

[75] Inventor: Hans Zimmermann, Mönchaltorf, Switzerland

[73] Assignee: Asea Brown Boveri Ltd., Baden, Switzerland

[21] Appl. No.: 524,907

[22] Filed: May 18, 1990

[30] Foreign Application Priority Data

Jul. 4, 1989 [CH] Switzerland .................. 2483/89

[51] Int. Cl.⁵ .................. H02K 1/18; H02K 15/14
[52] U.S. Cl. .................. 310/258; 29/596; 310/42
[58] Field of Search .................. 29/596; 310/91, 254, 310/258, 259, 42

[56] References Cited

U.S. PATENT DOCUMENTS

| | | | |
|---|---|---|---|
| 2,078,668 | 4/1937 | Kilgore | 310/258 |
| 2,489,109 | 11/1949 | Shildneck et al. | 310/217 |
| 3,708,707 | 1/1973 | Kranz | 310/258 |
| 3,940,648 | 2/1976 | Wielt et al. | 310/217 |
| 4,284,920 | 8/1981 | Nelson | 310/217 |
| 4,587,722 | 5/1986 | Miller | 310/258 |
| 4,663,553 | 5/1987 | Zimmermann | 310/258 |
| 4,881,001 | 11/1989 | Patel et al. | 310/258 |

FOREIGN PATENT DOCUMENTS

| | | |
|---|---|---|
| 0087116 | 8/1983 | European Pat. Off. . |
| 0166114 | 1/1986 | European Pat. Off. . |
| 532315 | 8/1931 | Fed. Rep. of Germany . |
| 1232651 | 1/1967 | Fed. Rep. of Germany . |
| 2022739 | 11/1970 | Fed. Rep. of Germany . |
| 1613224 | 1/1971 | Fed. Rep. of Germany . |

Primary Examiner—Steven L. Stephan
Assistant Examiner—D. L. Rebsch
Attorney, Agent, or Firm—Oblon, Spivak, McClelland, Maier & Neustadt

[57] ABSTRACT

In horizontal-axis electrical machine, a laminated stator core is provided with a stator frame consisting of support rings and axial support bars. The frame is suspended in a housing by means of a bolt arrangement. In this arrangement, the construction is suspended in such a manner that the stator is held in place elastically in the axial direction, and rigidly in the radial and circumferential directions.

4 Claims, 4 Drawing Sheets

HORIZONTAL AXIS ELECTRICAL MACHINE WITH RADIAL SUPPORT BOLTS

BACKGROUND OF THE INVENTION

1. Field of the Invention

The invention relates to a horizontal-axis electrical machine having a laminated stator core which is braced in mutually spaced-apart support rings, that are arranged orthogonally with respect to the longitudinal machine axis. The rings are secured using mounting wedges distributed at the circumference of the machine, and are connected to the housing of the machine via mounting parts.

In this connection, the invention refers to a prior art as found, for example, in EP Patent Specification 0 166 114 or CH Patent Application 3557/88 of 23.09.1988 of the applicant.

2. Discussion of Background

In gas-cooled electrical machines of the entire power range, large axial and radial strains occur in the laminated stator core that must be transferred to the housing, distributed as uniformly as possible.

In the air-cooled turbine-driven generator known from EP Patent Specification 0 166 114, this is done by laterally suspending the laminated stator core with support plates which are arranged in parallel, and are perpendicular to the axis of the electrical machine, and are mutually spaced apart. In order to keep vibrations and thermal stresses which occur as small as possible during the operating state of the electrical machine, the support plates are annularly constructed and connected to the bottom part of the housing, by means of mounting parts, only two areas of their horizontal plane of symmetry on both sides, via extensions extending vertically in a straight line. By far the greatest proportion of the circumference of the support plates is spaced away from the bottom and top part of the housing. The laminated stator core is braced in the support plates, via mounting wedges uniformly distributed over its entire circumference. The mounting parts consist of mounting plates, which are in each case welded to the extensions of the support plates, and of horizontal-axis tubular pieces, which are welded to the mounting plates. This type of mounting of the laminated stator core allows simple assembly, easy accessibility of the constructional parts to be welded together, and ensures a good quality of the welds.

However, the known arrangement presupposes a housing which is approximately divided in the horizontal plane of symmetry of the machine in order to be able to insert the laminated stator core. Changing to hydrogen cooling is thus not easy because, in particular, the interfaces between bottom and top part of the housing are problematic with respect to sealing.

In order to be able to use an undivided housing in such machines, the CH Patent application initially mentioned proposes to have the mounting plates mounted at the annular support plates, and at different diameters which are stepped towards the other end as seen from one end of the machine, and correspondingly to step the associated mounting points at the housing. In this arrangement, the transverse walls are constructed of two parts and consist of a first ring which is mounted at the laminated stator core and a second ring which is mounted at the housing, the free ring ends overlapping, and a seal which is elastic in the axial direction being provided at the point of overlap. Seen from the other end of the machine, the outside diameters of the first rings are in each case smaller than the inside diameter of the second ring adjacent to it.

Such a design allows an undivided housing to be used because the laminated stator core (which may already be provided with the stator winding; a so-called built-in stator can be inserted into the housing. It is much simpler to make closed housings of this type gastight and they also withstand the higher gas pressures approximately 10 bar in the case of hydrogen cooling.

A disadvantage of both designs is that, due to the variety of welded connections, removal of the laminated core for repair and service purposes is difficult.

SUMMARY OF THE INVENTION

Accordingly, one object of this invention is to provide a novel horizontal-axis electrical machine, proceeding from the prior art, which functions without elaborate spring and/or support elements, and accordingly exhibits a simple and economic construction, and in addition, allows the simple removal and installation of the laminated stator core.

In a horizontal-axis electrical machine of the generic type initially mentioned, this object is achieved in accordance with the invention by providing at the support rings, several support bars extending in the longitudinal direction of the machine which are spaced apart from the laminated stator core and are arranged symmetrically with respect to the vertical plane of symmetry. Inward-painting plates extending orthogonally with respect to the longitudinal machine axis are provided at the housing part. The constructional unit consisting of a laminated stator core, support rings' and support bars' is screwed to the housing by means of radial bolt arrangements which act on the inside unit at the support bars, and at the outside housing, on the plates.

The mounting according to the invention of the laminated stator core on the plates is "soft" in the longitudinal direction of the machine but "hard" in the circumferential direction. This results in an optimum suspension which takes into account all operating loads. In addition, the design is also economic. The laminated stator core, together with its "frame" consisting of support rings and support bars, can be pulled (axially) out of the housing in a comparatively simple manner after detaching the screw connections.

In gas-cooled electrical machines, the annular space between laminated stator core and housing shell is regularly subdivided into several chambers which are used for supplying and removing the cooling gas. In a preferred embodiment of the invention, these chambers are formed by the protrusion of the support rings past the support bars into the annular space. The support rings are sealed to the annular ribs, which they overlap, and which are mounted at the housing shell. In order to allow (axial) removal of the constructional unit out of the housing in this arrangement, both the support rings and the annular ribs are stepped in the axial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
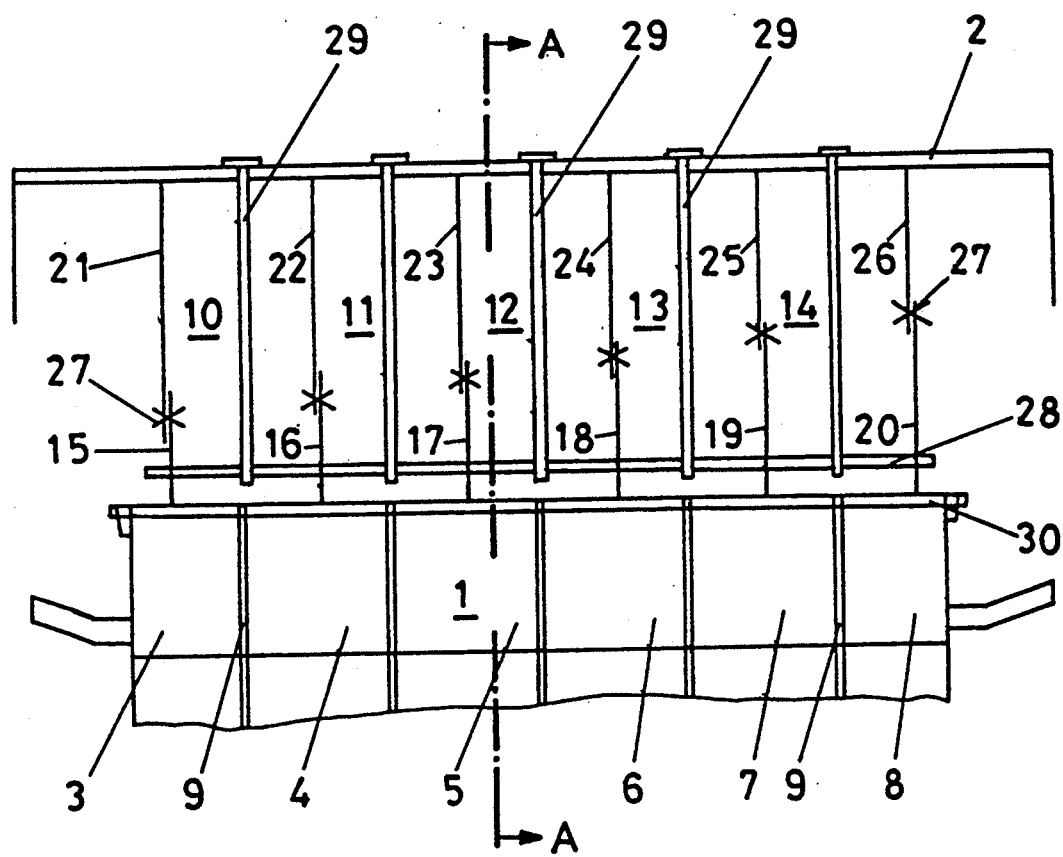
FIG. 1 shows a simplified longitudinal section through the stator of an electrical machine.

Referring now to the drawings, wherein like reference numerals designate identical or corresponding parts throughout the several views, a laminated stator core 1 is arranged in a one-piece housing 2 in the greatly simplified longitudinal section through the stator of an electrical machine according to FIG. 1. The laminated stator core 1 consists of individual laminated part-cores 3 to 8 which are axially spaced apart from one another. Through these gaps 9 cooling gas flows into or out of the chambers 10 to 14 in the space between laminated stator core 1 and housing wall 2. These chambers are formed by support rings 15-20 which are arranged at the laminated stator core, and radial annular ribs 21 to 26 which are mounted at the housing wall. Annular ribs and support rings overlap one another radially. At the points of overlap, elastic annular seals 27 are provided. In the case of the example, four support bars which pass through the support rings 15 and 20 and are welded to the latter extend radially spaced apart from the laminated stator core 1. The constructional unit consisting of the laminated stator core 28 is suspended/mounted by means of bolt arrangements 29 which, in the case of the example, are uniformly distributed over the circumference and on the inside act on the support bars 28 and on the outside act on the housing shell 2. The essential feature in this is not the uniform distribution of the bolt arrangements/support bars. Instead, the points of application of the forces acting on the housing from the laminated stator core should be symmetric with respect to the vertical plane of symmetry of the machine. In practice, angles of 60 to 90 degrees between the two upper and the two lower bolt arrangements, respectively, have been successful in this arrangement, the housing 2 then being supported on the foundation approximately at the level of the horizontal plane of symmetry of the machine.

Before this laminated core suspension is described in detail, the construction of the laminated stator core 1 will first be explained with reference to FIGS. 2 and 3. The laminated stator core consisting of a plurality of single laminations stacked on top of one another, and is held together in the axial direction by means of tiebolts 30 with rectangular cross section which are located in slots on the circumference of the laminated core. Onto the tiebolts, wedges 31 are welded, which in turn are welded to the support rings 16,...,20.

The four support bars 28, which pass through all support rings 15 to 20, are welded to the latter, and essentially extend over the entire axial length of the laminated stator core 1. In the embodiment of the figures, they are uniformly distributed around the circumference but can also be arranged in such a manner that the angle α between the upper two support bars and the angle β between the lower two support bars is smaller than 90°. The smaller these angles, the more the housing wall between the lateral mounting points of the bolt arrangements 29 acts as a spring which decouples the laminated stator core 1 from the foundation.

Figure 4:
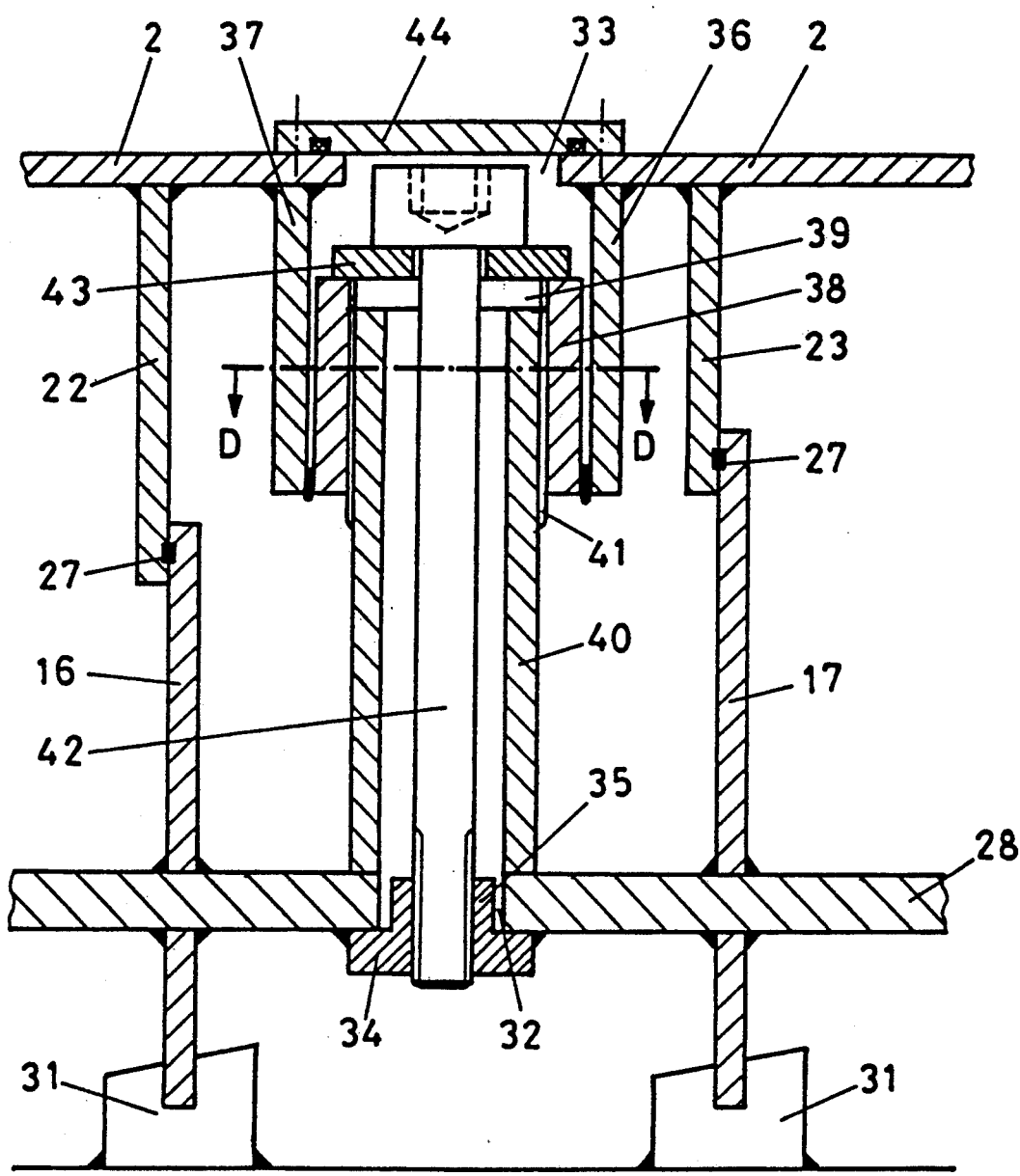
FIG. 4 shows a partial longitudinal section through FIG. 2 along its line CC.
Figure 6:
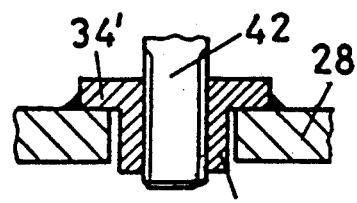
FIG. 6 shows a modification of the mounting of FIG. 4 at the laminated core.
Figure 5:
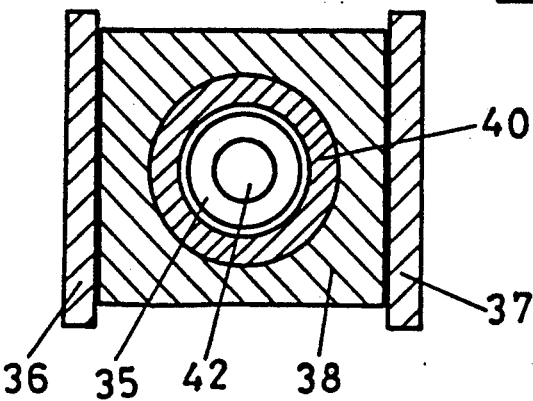
FIG. 5 shows a section through a bolt arrangement according to FIG. 4 along its line DD.

The suspension of the "constructional unit" in the housing 2 will now be described with reference to FIGS. 4 and 5. In the central section of each chamber 10–14, radially aligned holes 32 and 33 are provided both in the support bars 28 and in the housing wall. At the hole 32, a nut 34 (34') with a recessed collar 35 (35') is welded either from the inside (FIG. 4) or from the outside (FIG. 6). In order to compensate for tolerances, the outside diameter of the collar 35 is smaller than the clear width of the hole 32 in the support bar 28.

On both sides of the hole 33 in the housing wall 2, two plates 36 and 37 are welded orthogonally to the longitudinal axis of the machine. In the space between the two plates 36, 37, a metal block 38 is welded in with a radially extending threaded hole 39, into which a spacing sleeve 40 with extended thread 41 is screwed in up to the stop at the support bar 28. A screw bolt 42 with hexagonal socket head is inserted through said spacing sleeve 40 with interposition of a washer 43 and screwed into the nut 34. After that, the hole 33 is closed gastight with a cover 44.

The operation and the special advantages of the invention are obtained from the subsequent description of the method for producing the machine.

In a first work cycle, the machine housing 2 is manufactured with essentially the following production steps:

making the holes 33 and attaching the plates 36, 37 to the housing wall on both sides of the holes 33, welding-in the metal blocks 38 only at the inner free end of the plates 36, 37 (welds 46);

welding-in the annular ribs 21,...,26 in accordance with the axial distribution of the support rings 15,...,20;

a so-called built-in stator, that is to say a laminated stator core 1 which is axially compressed by means of tiebolts 30 is the starting point for the further assembly. The housing 2 is used as gage for producing the stator frame which essentially consists of the support rings 15,...,20 and the support bars 28 connecting them. The holes 32 are already made at the later mounting points of the bolt arrangements. After that, both machine parts are coaxially aligned with the assistance of, among other things, the spacing sleeves 40 which can be screwed in and the screw bolts 42 and nuts 34.

After completed alignment, the nuts 34 are welded to the support bars 28.

After that, the spacing sleeves 40 and the screw bolts 42 are removed to the outside, the stator frame is pulled out of the housing 2 and slipped over the built-in stator.

The stator frame is now firmly joined to the built-in stator. For this purpose, the wedges 31 are welded both to the tiebolts 30 and to the support rings 15,...,20 after the alignment of the two machine parts.

Figure 2:
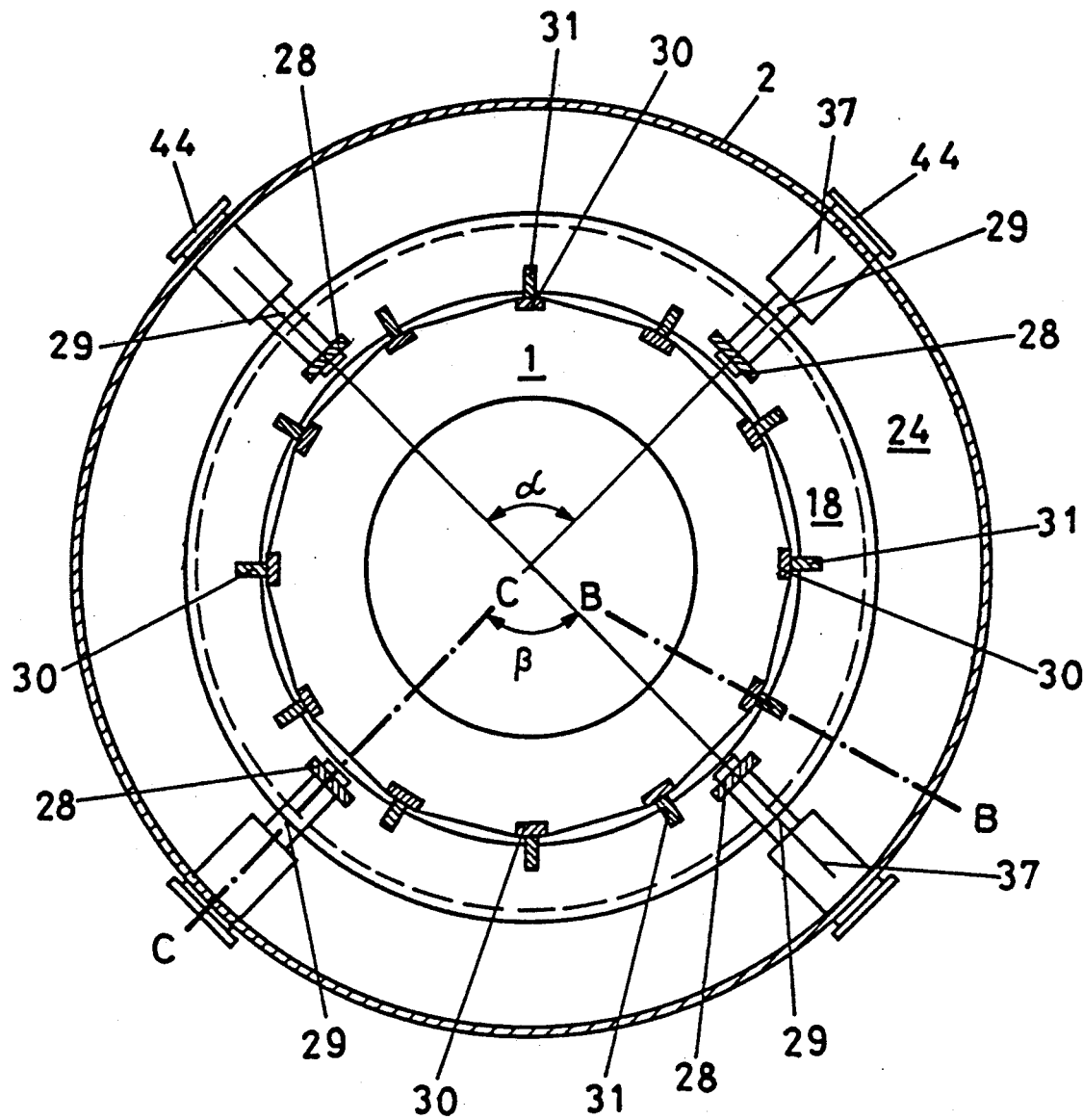
FIG. 2 shows a more detailed transverse section through the machine according to FIG. 1 along its line AA.
Figure 3:
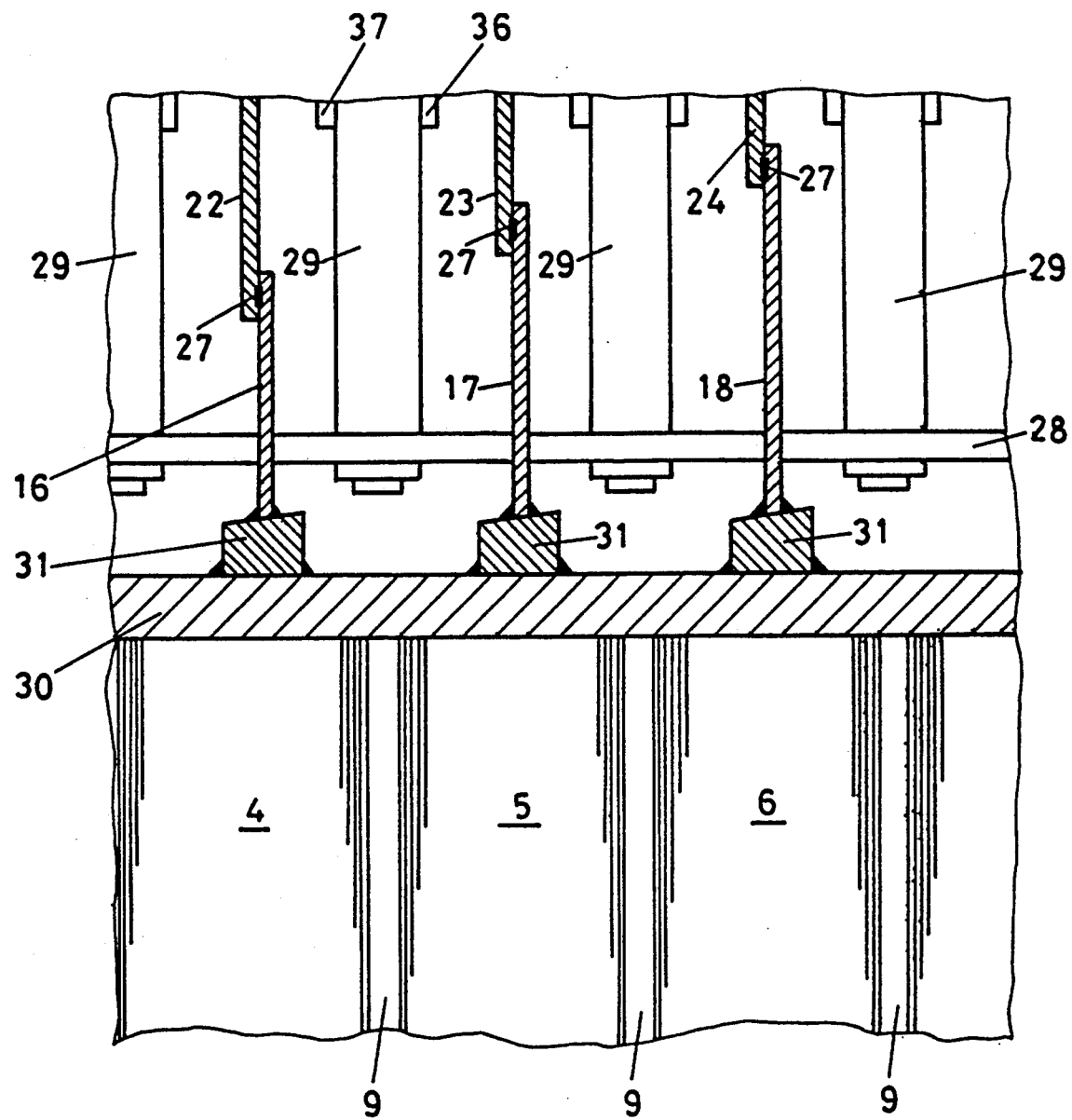
FIG. 3 shows a partial longitudinal section through FIG. 2 along its line BB.

The sealing between the two chambers 10,11,...,14 on the side of the laminated core is not shown in FIGS. 1 and 2 for reasons of a simple representation. In the technical implementation of the invention, however, gaps must be provided, at least for assembly reasons, between the annular ribs 15,...,20 and the laminated core 1. These gaps are sealed after the connection described between the stator frame and the laminated core, for example by dot-welding-on thin plates which match the outside contour of the laminated core 1, but which leaves small gaps (within the millimeter range) between themselves and the laminated core in order to eliminate any friction at the laminated core.

Finally, the built-in stator (now provided with the frame) is moved into the machine housing 1. Both of the machine parts are then aligned with respect to one another. Then the spacing sleeves 40 are shut and the screw bolts 42 are screwed into the nuts 34 and the covers 44 are screwed onto the openings 33.

In summary, the technical and economic advantages of the construction(s) described above can be represented as follows:

The suspension of the laminated core meets the requirement for strength in the circumferential direction and the requirement for elasticity in the axial direction.

The stator can be produced in a simple and economic manner. The fact that the design "meets the requirements of tolerances" must be emphasized. Comparatively large tolerances (order of magnitude 5–10 mm) can be accommodated both axially and tangentially, and tolerances of virtually any magnitude can be tolerated in the radial direction. This is particularly important in order to be able to compensate for welding inaccuracies without elaborate and expensive trial assemblies being needed during the production Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by letters patent of the United States is:

1. A horizontal axis electrical machine comprising:
   a housing comprising an inner cylindrical surface with a given radius, said surface defining a first cylindrical axis, said housing oriented so that said first axis is horizontal;
   plates connected at said inner surface, said plates having major surfaces which are parallel to at least one radially outward pointing line which passes through said plate;
   bolts pointing radially inward secured to said housing by fastening means comprising said plates;
   a constructional unit comprising a laminated stator core, mounting wedges, support bars, and spaced apart rings;
   said laminated stator core having a generally cylindrical outer surface which defines a second cylindrical axis and an outer stator core diameter, said unit oriented so that said second axis is horizontal;
   said wedges connected at said outer surface;
   said spaced apart rings having a ring outer diameter and a ring inner diameter, said ring inner diameter is larger than said stator core diameter, said rings are positioned to have said stator core inside said inner diameter, and said rings are connected at said wedges to said stator core;
   said support bars spaced apart from said stator core and extending parallel to said second axis are connected at said rings, said bars symmetrically spaced around a vertical plane defined by said second axis and the vertical direction;
   said first axis substantially coaxial with said second axis, and said unit substantially inside said inner cylindrical surfaces; and
   bolts pointing radially inward and secured to said housing by fastening means comprising said plates, and secured to said unit by fastening means comprising said bars, thereby accommodating large tolerances in alignment of said unit and said housing while rigidly holding said stator core in circumferential directions, and elastically holding said stator core in said axial direction.

2. A horizontal axis electrical machine, as recited in claim 1, further comprising:
   blocks attached at said inner surface, wherein each of said blocks is between, and adjacent to, two of said plates, and said blocks firmly connected to said plates at the innermost edge of said plates.

3. A horizontal axis electrical machine, as recited in claim 2, wherein:
   each of said blocks is provided with a radially extending threaded hole, defining an axis, each said block positioned so that said axis intersects a selected spacing bar;
   further comprising a spacing sleeve with external thread which is threaded into said hole, said sleeve long enough to be threaded into said housing and butt up to said selected support bar.

4. A horizontal axis electrical machine, as recited in any one of claims 1 to 3, further comprising:
   annular ribs with inner and outer rib diameters and with outer edges mounted at said inner surface, wherein an inner annular portion of each of said ribs is adjacent to an outer annular portion of each of said rings, defining pairs which consist of a ring and an adjacent rib:
   an annular sealing means provided between adjacent portions of each said pairs, thereby defining chambers between said inner surface, and said outer core diameter;
   said rib inner diameters and said ring outer diameters increasing along the axial direction from a front end of said machine to a rear end of said machine;
   every rib closer to said rear end than a selected ring has a larger rib inner diameter than the outer diameter of said selected ring,
   thereby allowing removal of said unit by axial movement of said unit along said rear direction.

* * * * *